United States Patent
Bourdelais et al.

(10) Patent No.: US 6,180,304 B1
(45) Date of Patent: Jan. 30, 2001

(54) TRANSLUCENT IMAGING PAPER DISPLAY MATERIALS WITH BIAXIALLY ORIENTED POLYOLEFIN SHEET

(75) Inventors: Robert P. Bourdelais, Pittsford; Alphonse D. Camp, Rochester; Peter T. Aylward, Hilton, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/156,063

(22) Filed: Sep. 17, 1998

(51) Int. Cl.[7] .................................................. G03G 15/04
(52) U.S. Cl. ........................... 430/64; 503/227; 428/511; 428/512; 428/513; 428/315.5
(58) Field of Search ............................. 430/64; 503/227; 428/511, 512, 513, 315.5

(56) References Cited

U.S. PATENT DOCUMENTS

| | | | |
|---|---|---|---|
| 3,944,699 | 3/1976 | Mathews et al. | 428/220 |
| 4,187,113 | 2/1980 | Mathews et al. | 430/533 |
| 4,283,486 | 8/1981 | Aono et al. | 430/505 |
| 4,632,869 | 12/1986 | Park et al. | 428/315.5 |
| 4,758,462 | 7/1988 | Park et al. | 428/213 |
| 4,900,654 | 2/1990 | Pollock et al. | 430/533 |
| 4,912,333 | 3/1990 | Roberts et al. | 250/487.1 |
| 4,977,070 | 12/1990 | Winslow | 430/510 |
| 5,055,371 | 10/1991 | Lee et al. | 430/126 |
| 5,100,862 | 3/1992 | Harrison et al. | 503/227 |
| 5,212,053 | 5/1993 | McSweeney et al. | 430/503 |
| 5,244,861 | 9/1993 | Campbell et al. | 503/227 |
| 5,387,501 | 2/1995 | Yajima et al. | 430/533 |
| 5,389,422 | 2/1995 | Okazaki et al. | 428/141 |
| 5,466,519 | 11/1995 | Shirakura et al. | 428/323 |
| 5,853,965 | 12/1998 | Haydock et al. | 430/496 |
| 5,866,282 | 2/1999 | Bourdelais et al. | 430/22 |
| 5,874,205 | 2/1999 | Bourdelais et al. | 430/496 |
| 5,888,643 | 3/1999 | Aylward et al. | 428/315.9 |
| 5,888,683 | 3/1999 | Gula et al. | 430/22 |
| 6,007,665 | 12/1999 | Bourdelais et al. | 156/277 |

FOREIGN PATENT DOCUMENTS

| | | |
|---|---|---|
| 0 662 633 A1 | 12/1995 | (EP) . |
| WO 94/04961 | 3/1994 | (WO) . |

*Primary Examiner*—Mark Chapman
(74) *Attorney, Agent, or Firm*—Paul A. Leipold

(57) ABSTRACT

The invention relates to an imaging element comprising a paper base, one layer of biaxially oriented polyolefin sheet and at least one image layer wherein said paper base sheet has a basis weight of between 40 and 120 g/m$^2$, and said biaxially oriented polyolefin sheet has a spectral transmission of at least 40% and a reflection density less than 60%.

20 Claims, No Drawings

TRANSLUCENT IMAGING PAPER DISPLAY MATERIALS WITH BIAXIALLY ORIENTED POLYOLEFIN SHEET

FIELD OF THE INVENTION

This invention relates to imaging materials. In a preferred form it relates to base materials for imaging translucent paper display.

BACKGROUND OF THE INVENTION

It is known in the art that photographic display materials are utilized for advertising, as well as decorative displays of photographic images. Since these display materials are used in advertising, the image quality of the display material is critical in expressing the quality message of the product or service being advertised. Further, a photographic display image needs to be high impact, as it attempts to draw consumer attention to the display material and the desired message being conveyed. Typical applications for display material include product and service advertising in public places such as airports, buses and sports stadiums, movie posters, and fine art photography. The desired attributes of a quality, high impact photographic display material are a slight blue density minimum, durability, sharpness, and flatness. Cost is also important, as display materials tend to be expensive compared with alternative display material technology, mainly lithographic images on paper. For display materials, traditional color paper is undesirable, as it suffers from a lack of durability for the handling, photoprocessing, and display of large format images.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult, requiring great care and expense to ensure proper laydown and cooling of the polyethylene layers. The formation of a suitably smooth surface would also improve image quality, as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials, as well as tint materials. It would be desirable if the optical brightener, whitener materials and tints, rather than being dispersed in a single melt extruded layer of polyethylene, could be concentrated nearer the surface where they would be more effective optically.

Prior art photographic transmission display materials with incorporated diffusers have light sensitive silver halide emulsions coated directly onto a gelatin coated clear polyester sheet. Incorporated diffusers are necessary to diffuse the light source used to backlight transmission display materials. Without a diffuser, the light source would reduce the quality of the image. Typically, white pigments are coated in the bottommost layer of the imaging layers. Since light sensitive silver halide emulsions tend to be yellow because of the gelatin used as a binder for photographic emulsions, minimum density areas of a developed image will tend to appear yellow. A yellow density minimum reduces the commercial value of a transmission display material because the imaging viewing public associates image quality with a white density minimum. It would be desirable if a transmission display material with an incorporated diffuser could have a more blue density minimum which people perceptually prefer.

It has been proposed in U.S. Pat. No. 5,212,053 to use a cellulose paper base with a basis weight less than 120 g/m$^2$ as a support for a photographic translucent display material. In U.S. Pat. No. 5,212,053 numerous advantages are obtained by the use of cellulose paper as a base. Advantages such as the low cost of paper compared to suitable polymer bases and an increase in manufacturing efficiency gained by the use of color photographic paper forming apparatus were disclosed. While all of these improvements are possible with the use of a paper base, the paper base does not have the required strength properties to be reliability processed in wet chemistry common with the imaging development process. When the backlighted photographic display materials are processed, the web can break causing a loss in efficiency in commercial photoprocessing labs. Further, the thin papers disclosed in U.S. Pat. No. 5,212,053 are not strong enough for efficient transport in digital printing equipment such as ink jet printers or thermal dye transfer printers. It would be desirable if translucent display material with a cellulose paper base had the required strength properties for efficient transport through digital printers, yet was thin enough to exhibit the required transmission properties.

Prior art photographic transmission display materials with incorporated diffusers have light sensitive silver halide emulsions coated directly onto a gelatin subbed clear polyester sheet. $TiO_2$ is added to the bottommost layer of the imaging layers to diffuse light so well that individual elements of the illuminating bulbs utilized are not visible to the observer of the displayed image. However, coating $TiO_2$ in the imaging layer causes manufacturing problems such as increased coating coverage which requires more coating machine drying and a reduction in coating machine productivity as the $TiO_2$ requires additional cleaning of the coating machine. Further, as higher amounts of $TiO_2$ are used to diffuse high intensity backlighting systems, the $TiO_2$ coated in the bottommost imaging layer causes unacceptable light scattering reducing the quality of the transmission image. It would be desirable to eliminate the $TiO_2$ from the image layers while providing the necessary transmission properties and image quality properties.

Prior art photographic transmission display material use polyester as a base for the support. Typically the polyester support is from 150 to 250 $\mu$m thick to provide the required stiffness. A cellulose paper base material would be lower in cost and allow for roll handling efficiency, as the rolls would weigh less and be smaller in diameter. It would be desirable to use a cellulose paper base material that had the required stiffness but was thinner to reduce cost and improve roll handling efficiency.

Prior art photographic transmission display materials, while providing excellent image quality, tend to be expensive when compared with other quality imaging technologies such as ink jet imaging, thermal dye transfer imaging, and gravure printing. Since photographic transmission display materials require an additional imaging processing step compared to digital imaging systems such as ink jet printing and thermal dye transfer printing, the cost of a transmission photographic display can be higher than digital imaging systems. The processing equipment investment required to process photographic transmission display materials also requires consumers to typically interface with a commercial processing lab, increasing time required to move from concept to image. It would be desirable if a high quality transmission display support could utilize nonphotographic quality imaging technologies.

Photographic transmission display materials have considerable consumer appeal as they allow images to be printed on high quality support for home or small business use. Consumer use of photographic display materials generally have been cost prohibitive since consumers typically do not have the required volume to justify the use of such materials. It would be desirable if a high quality transmission display material could be used in the home without a significant investment in equipment to print the image.

PROBLEM TO BE SOLVED BY THE INVENTION

There is a need for low cost paper transmission display materials that provide improved transmission of light while, at the same time, more efficiently diffusing the illuminating light source such that the elements of the illuminating light source are not apparent to the viewer.

SUMMARY OF THE INVENTION

It is an object of the invention to provide improved transmission display materials.

It is another object to provide display materials that are lower in cost, as well as providing sharp durable images.

It is a further object to provide more efficient use of the light used to illuminate transmission display materials.

It is another object to provide a thin imaging base with the required strength properties to ensure more efficient handling and display of images.

It is further object to provide a transmission display that utilizes non photographic imaging technology.

These and other objects of the invention are accomplished by an imaging element comprising a paper base, one layer of biaxially oriented polyolefin sheet and at least one image layer wherein said paper base sheet has a basis weight of between 40 and 120 g/m$^2$, and said biaxially oriented polyolefin sheet has a spectral transmission of at least 40% and a reflection density less than 60%.

ADVANTAGEOUS EFFECT OF THE INVENTION

The invention provides a low cost support with brighter images by allowing more efficient diffusion of light used to illuminate display materials. The support is also strong enough for efficient web transport through digital imaging equipment.

DETAILED DESCRIPTION OF THE INVENTION

The invention has numerous advantages over prior transmission display materials and methods of imaging transmission display materials. The display materials of the invention provide very efficient diffusing of light while allowing the transmission of a high percentage of the light. The materials are low in cost, as the translucent cellulose paper base is thinner than in prior products, yet strong enough to provide improved handling and display of images. The formation of transmission display materials requires a display material that diffuses light so well that individual elements of the illuminating bulbs utilized are not visible to the observer of the displayed image. On the other hand, it is necessary that light be transmitted efficiently to brightly illuminate the display image. The invention allows a greater amount of illuminating light to actually be utilized as display illumination while, at the same time, very effectively diffusing the light sources such that they are not apparent to the observer. The display material of the invention will appear whiter to the observer than prior art materials which have a tendency to appear somewhat yellow, as they require a high amount of light scattering pigments to prevent the viewing of individual light sources. These high concentrations of pigments appear yellow to the observer and also result in an image that is darker than desirable. Because nonphotographic imaging systems are used to image the support, the display material are more accessible to the consumer, as digital printing systems such as ink jet or thermal dye transfer are widely available and low in cost for small volume. Finally, since the imaging technology used in this invention does not require wet chemistry processing of images, the environmental problems associated with the use and disposal of processing chemicals are avoided. These and other advantages will be apparent from the detailed description below.

The terms as used herein, "top", "upper", "imaging side", and "face" mean the side or toward the side of the polymer sheet in contact with biaxially oriented polymer sheet. The terms "bottom", "lower side", and "back" mean the side opposite or toward the side opposite to the side of the polymer sheet in contact with the biaxially oriented sheet or toward the side of the cellulose paper base.

The layers of the biaxially oriented polyolefin sheet of this invention have levels of voiding, TiO$_2$ and colorants adjusted to provide optimum transmission properties when combined with a low cost cellulose paper base. The paper provides an efficient means of diffusing the illuminating light source used to illuminate the image. The paper fiber/air interfaces in the cellulose paper of this invention diffuse the illuminating light without interfering with the quality of the image. Paper fiber is also lower in cost than a polymer base making cellulose paper an ideal transmission display base material. Thin paper bases are utilized in this invention and are much thinner than conventional paper bases used in reflective images. Paper bases used in reflective print materials are typically 200% thicker than the paper bases used in this invention. A reflective paper base is not suitable for this invention because the low light transmission of a reflective paper base would not allow for sufficient illumination of the image.

An important aspect of this invention is the high strength biaxially oriented polymer sheet laminated to the cellulose paper base. Prior art photographic cellulose paper transmission display materials suffer from a lack of strength causing problems in handling and transport thought digital printers. Lamination of a high strength biaxially oriented polymer sheet to the cellulose paper not only significantly increases the strength of the imaging support, but also allows a reduction in paper thickness which improves the percent transmission of the imaging element significantly improving image quality over prior art paper transmission display materials. The biaxially oriented sheet is laminated to the top of the cellulose paper base only because the transmission materials of this invention do not require curl control as they are typically constrained in a display frame or lightbox.

One example of the usefulness of this invention is the production of movie posters. Prior art movie posters comprise clay coated paper that has been ink printed using flexography. While these materials are useful, the image quality suffers because of the low quality support used in the printing of the movie posters. By laminating a biaxially oriented sheet to a low basis weight paper, the translucent display materials of this invention enable much higher image quality than clay coated paper and provide the required strength to allow for efficient printing is a six color printing press.

Any suitable biaxially oriented polyolefin sheet may be utilized for the sheet on the top side of the laminated base of the invention. Microvoided composite biaxially oriented sheets are preferred because the voids provide opacity without the use of $TiO_2$. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758, 462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 micrometers, preferably from 20 to 70 $\mu$m. Below 20 $\mu$m, the microvoided sheets may not be thick enough to minimize any inherent nonplanarity in the support and would be more difficult to manufacture. At thickness higher than 70 $\mu$m, little improvement in either surface smoothness or mechanical properties are seen, and so there is little justification for the further increase in cost for extra materials.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization and limited coalescence directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not degrade the performance of the imaging element in which the biaxially oriented polyolefin film is utilized.

For the biaxially oriented sheets on the top side toward the imaging layers, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix.

The total thickness of the topmost skin layer or exposed surface layer should be between 0.20 $\mu$m and 1.5 $\mu$m, preferably between 0.5 and 1.0 $\mu$m. Below 0.5 $\mu$m any inherent nonplanarity in the coextruded skin layer may result in unacceptable color variation. At skin thickness greater than 1.0 $\mu$m, there is a reduction in the imaging optical properties such as image resolution. At thickness greater that 1.0 $\mu$m there is also a greater material volume to filter for contamination such as clumps, poor color pigment dispersion, or contamination. Low density polyethylene with a density of 0.88 to 0.94 g/cc is the preferred material for the top skin because image receiving layers typically adhere well to low density polyethylene compared to other materials such as polypropylene and high density polyethylene.

Addenda may be added to the topmost skin layer of the biaxially oriented sheet to change the color of the imaging element. For imaging use, a white base with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment Blue 60.

It has been found that that a very thin coating (0.2 to 1.5 $\mu$m) on the surface immediately below the imaging layer can be made by coextrusion and subsequent stretching in the width and length direction. It has been found that this layer is, by nature, extremely accurate in thickness and can be used to provide all the color corrections which are usually distributed throughout the thickness of the sheet between the imaging layer and the paper base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used, and high quality filtration to clean up the colored layer is much more feasible since the total volume of polymer with colorant is only typically 2 to 10 percent of the total polymer between the base paper and the imaging layer.

While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 $\mu$m does not substantially improve the optical properties of the support, will add cost to the design, and will cause objectionable pigment lines in the extrusion process.

Addenda may be added to the biaxially oriented sheet of this invention so that when the biaxially oriented sheet is viewed by the intended audience, the imaging element emits light in the visible spectrum when exposed to ultraviolet radiation. Emission of light in the visible spectrum allows for the support to have a desired background color in the presence of ultraviolet energy. This is particularly useful when images are backlit with a, illuminating light source that contains ultraviolet energy and may be used to optimize image quality for transmission display applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Light emissions less than 1 b* unit cannot be noticed by most customers; therefore, is it not cost effective to add optical brightener to the biaxially oriented sheet, as 1 b* unit is not significant. An light emission greater that 5 b* units would interfere with the color balance of the prints making the whites appear too blue for most consumers.

The preferred addenda of this invention is an optical brightener. An optical brightener is a substantially colorless, fluorescent, organic compound that absorbs ultraviolet light and emits it as visible blue light. Examples include, but are not limited, to derivatives of 4,4'-diaminostilbene-2,2'-disulfonic acid, coumarin derivatives such as 4-methyl-7-diethylaminocoumarin, 1-4-Bis (O-Cyanostyryl) Benzol, and 2-Amino-4-Methyl Phenol. An unexpected desirable feature of this invention is efficient use of optical brightener. Because the ultraviolet source for a transmission display material is on the opposite side of the image, the ultraviolet light intensity is not reduced by ultraviolet filters common to imaging layers for dye stability. The net result of backlighting a transmission display material is that less optical brightener is required to achieve the desired background color compared to a reflection display material that depends on top side illumination.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. When the desired weight % loading of the optical brightener begins to approach the concentration at which the optical brightener migrates to the surface of the support forming crystals in the imaging layer, the addition of optical brightener into the layer adjacent to the exposed layer is preferred. When optical brightener migration is a concern as with light sensitive silver halide imaging systems, the preferred exposed layer comprised polyethylene. In this case, the migration from the layer adjacent to the upper exposed layer is significantly reduced allowing for much higher optical brightener levels to be used to optimize image quality. Locating the optical brightener in the layer adjacent to the upper exposed layer allows for a less expensive optical brightener to be used as the exposed layer, which is substantially free of optical brightener and prevents significant migration of the optical brightener. Another preferred method to reduce unwanted optical brightener migration is to use polypropylene for the layer adjacent to the exposed surface. Since optical brightener is more soluble in polypropylene than polyethylene, the optical brightener is less likely to migrate from polypropylene.

A biaxially oriented sheet of this invention which has a microvoided core is preferred. The microvoided core adds opacity and whiteness to the imaging support, further improving imaging quality. Further, the voided core is an excellent diffuser of light and has substantially less light scatter than white pigments such as $TiO_2$. Less light scatter improves the quality of the transmitted image. Combining the image quality advantages of a microvoided core with a material which absorbs ultraviolet energy and emits light in the visible spectrum allows for the unique optimization of image quality as the image support can have a tint when exposed to ultraviolet energy, yet retain excellent whiteness when the image is viewed using lighting that does not contain significant amounts of ultraviolet energy such as indoor lighting. The preferred number of voids in the vertical direction at substantially every point is greater than six. The number of voids in the vertical direction is the number of polymer/gas interfaces present in the voided layer. The voided layer functions as an opaque layer because of the index of refraction changes between polymer/gas interfaces. Greater than 6 voids is preferred because at 4 voids or less, little improvement in the opacity of the film is observed and, thus, does not justify the added expense to void the biaxially oriented sheet of this invention. Between 6 and 30 voids in the vertical direction is most preferred because at 35 voids or greater, the voided core can be easily stress fractured resulting in undesirable fracture lines in the image area which reduce the commercial value of the transmission display material.

The biaxially oriented sheet may also contain pigments which are known to improve the imaging responses such as whiteness or sharpness. Titanium dioxide is used in this invention to improve image sharpness. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for an imaging system are DuPont Chemical Co. R101 rutile $TiO_2$ and DuPont Chemical Co. R104 rutile $TiO_2$. Other pigments to improve imaging responses may also be used in this invention such as barium sulfate, clay, or calcium carbonate.

The preferred amount of $TiO_2$ added to the biaxially oriented sheet of this invention is between 4 and 18% by weight. Below 3% $TiO_2$, the required light transmission cannot be easily achieved with microvoiding alone. Combining greater than 4% $TiO_2$ with voiding provides a biaxially oriented, microvoided sheet that is low in cost. Above 14% $TiO_2$, additional dye density is required to overcome the loss in transmission.

The preferred spectral transmission of the biaxially oriented polyolefin sheet of this invention is at least 40% and less than 90%. Spectral transmission is the amount of light energy that is transmitted through a material. For an imaging element, spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer. The higher the transmission, the less opaque the material. For a transmission display material with an incorporated diffuser, the quality of the image is related to the amount of light reflected from the image to the observer's eye. A transmission display image with a low amount of spectral transmission does not allow sufficient illumination of the image causing a perceptual loss in image quality. A transmission image with a spectral transmission of less than 35% is unacceptable for a transmission display material, as the quality of the image cannot match prior art transmission display materials. Further, spectral transmissions less than 35% will require additional dye density which increases the cost of the transmission display material. A transmission display material with a percent transmission greater than 90% would allow for significant illuminating light interference with the image.

The most preferred spectral transmission density for the biaxially oriented sheets of this invention is between 46% and 54%. This range allows for optimization of transmission and reflection properties to create a display material that diffuses the backlighting source and minimizes dye density of the image layers.

A reflection density less than 60% for the biaxially oriented sheet of this invention is preferred. Reflection density is the amount of light energy reflecting from the image to an observer's eye. Reflection density is measured by 0°/45° geometry Status A red/green/blue response using an X-Rite model 310 (or comparable) photographic transmission densitometer. A sufficient amount of reflective light energy is required to diffuse the backlighting source. A reflection density greater than 65% is unacceptable for a transmission display material and does not match the quality of prior art transmission display materials.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers while restraining to some degree the sheet against retraction in both directions of stretching.

The composite sheet, while described as having preferably at least three layers of a core and a skin layer on each side, may also be provided with additional layers that may serve to change the properties of the biaxially oriented sheet. Biaxially oriented sheets could be formed with surface layers that would provide an improved adhesion, or look to the support and imaging element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the imaging layers. Examples of this would be acrylic coatings for printability and coating polyvinylidene chloride for heat seal properties. Further examples include flame, plasma, or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented sheet where the exposed surface layer is adjacent to the imaging layer is as follows:

| |
|---|
| Polyethylene skin with blue pigments (surface layer) |
| Polypropylene with 4% $TiO_2$ and optical brightener |
| Polypropylene microvoided layer |
| Polypropylene bottom skin layer |

The support to which the microvoided composite sheets and biaxially oriented sheets are laminated may be any cellulose paper with the desired transmission and stiffness properties. Cellulose paper is preferred as the cellulose fiber/air interfaces in the paper provide an efficient diffuser of illuminating light sources and are low in cost compared to suitable polymer bases. In the case of imaging systems, suitable cellulose papers must not interact with the imaging receiving layer chemistry. An imaging grade paper used in this invention must be "smooth" as to not interfere with the viewing of images. The surface roughness of cellulose paper or $R_a$ is a measure of relatively finely spaced surface irregularities on the paper. The surface roughness measurement is a measure of the maximum allowable roughness height expressed in units of micrometers and by use of the symbol $R_a$. For the paper of this invention, long wavelength surface roughness or orange peel is of interest. For the irregular surface profile of the paper of this invention, a 0.95 cm diameter probe is used to measure the surface roughness of the paper and, thus, bridges all fine roughness detail. The preferred surface roughness of the paper is between 0.13 and 0.44 µm. At surface roughness greater than 0.44 µm, the image quality observed is not of as high quality. A cellulose paper surface roughness less than 0.13 µm is difficult to manufacture and costly.

The preferred basis weight of the cellulose paper of the invention is between 40 and 120 $g/m^2$. A basis weight less than 30 $g/m^2$ yields an imaging support that does not have the required stiffness for transport through digital imaging equipment. Additionally, a basis weight less than 30 $g/m^2$ yields an imaging support that does not have the required stiffness for consumer acceptance. At basis weights greater than 130 $g/m^2$ the imaging support stiffness, while acceptable to consumers, exceeds the stiffness requirement for a captured display material. The preferred fiber length of the paper of this invention is between 0.40 and 0.58 mm. Fiber Lengths are measured using a FS-200 Fiber Length Analyzer (Kajaani Automation Inc.). Fiber lengths less than 0.35 mm are difficult to achieve in manufacturing and, as a result, expensive. Because shorter fiber lengths generally result in an increase in paper modulus, paper fiber lengths less than 0.35 mm will result in an imaging paper. This is very difficult to chop and convey in digital printing equipment. Paper fiber lengths greater than 0.62 mm do not show an improvement in surface smoothness.

The preferred density of the cellulose paper of this invention is between 1.05 and 1.20 g/cc. A sheet density less than 1.05 g/cc would not provide the smooth surface preferred by consumers. A sheet density that is greater than 1.20 g/cc would be difficult to manufacture requiring expensive calendering and a loss in machine efficiency.

The machine direction to cross direction modulus is critical to the quality of the imaging support, as the modulus ratio is a controlling factor in imaging element curl and a balanced stiffness in both the machine and cross directions. The preferred machine direction to cross direction modulus ratio is between 1.4 and 1.9. A modulus ratio of less than 1.4 is difficult to manufacture since the cellulose fibers tend to align primarily with the stock flow exiting the paper machine head box. This flow is in the machine direction and is only counteracted slightly by fourdrinier parameters. A modulus ratio greater than 1.9 does not provide the desired curl and stiffness improvements to the laminated imaging support.

A cellulose paper substantially free of $TiO_2$ is preferred, as the opacity of the imaging support can be improved by laminating a microvoided biaxially oriented sheet to the cellulose paper of this invention. The elimination of $TiO_2$ from the cellulose paper significantly improves the efficiency of the paper making process, eliminating the need for cleaning unwanted $TiO_2$ deposits on critical machine surfaces. A paper base substantially free of $TiO_2$ also reduces internal light scatter common in prior art materials that use $TiO_2$ in the base. Internal light scatter for a display material reduces the image quality. However, if $TiO_2$ is desired to improve the opacity of the support, for example, then cellulose paper of this invention may contain any addenda known in the art to improve the imaging quality of the paper. The $TiO_2$ used may be either anatase or rutile type. Examples of $TiO_2$ that are acceptable for addition of cellulose paper are DuPont Chemical Co. R101 rutile $TiO_2$ and DuPont Chemical Co. R104 rutile $TiO_2$. Other pigments to improve imaging responses may also be used in this invention. Pigments such as talc, kaolin, $CaCO_3$, $BaSO_4$, ZnO, $TiO_2$, ZnS, and $MgCO_3$ are useful and may be used alone or in combination with $TiO_2$.

A cellulose paper substantially free of dry strength resin and wet strength resin is preferred because the elimination of dry and wet strength resins reduces the cost of the cellulose paper and improves manufacturing efficiency. Dry strength and wet strength resins are commonly added to cellulose photographic paper to provide strength in the dry state and strength in the wet state, as the paper is developed in wet processing chemistry during the photofinishing of consumer images. In this invention, dry and wet strength resin are no longer needed, as the digital imaging techniques do not require wet chemistry processing.

Any pulps known in the art to provide image quality paper may be used in this invention. Bleached hardwood chemical kraft pulp is preferred, as it provides brightness, a good starting surface, and good formation while maintaining strength. In general, hardwood fibers are much shorter than softwood by approximately a 1:3 ratio. Pulp with a brightness less than 90% Brightness at 457 nm is preferred. Pulps with brightness of 90% or greater are commonly used in imaging supports because consumers typically prefer a white paper appearance. A cellulose paper less than 90% Brightness at 457 nm is preferred for cost reasons, as the whiteness of the imaging support can be improved by laminating a microvoided biaxially oriented sheet to the cellulose paper of this invention. The reduction in brightness of the pulp allows for a reduction in the amount of bleaching required, thus lowering the cost of the pulp and reducing the bleaching load on the environment.

Cellulose paper used in this invention can be made on a standard continuous fourdrinier wire machine. For the formation of cellulose paper of this invention, it is necessary to refine the paper fibers to a high degree to obtain good formation. This may be accomplished in this invention by providing wood fibers suspended in water, bringing said fibers into contact with a series of disc refining mixers and conical refining mixers such that fiber development in disc refining is carried out at a total specific net refining power of 44 to 66 KW hrs/metric ton and cutting in the conical mixers is carried out at a total specific net refining power of between 55 and 88 KW hrs/metric ton, applying said fibers in water to a foraminous member to remove water, drying said paper between press and felt, drying said paper between cans, applying a size to said paper, drying said paper between steam heated dryer cans, applying steam to said paper, and passing said paper through calender rolls. The preferred specific net refining power (SNRP) of cutting is between 66 and 77 KW hrs/metric ton. A SNRP of less than 66 KW hrs/metric ton will provide an inadequate fiber length reduction resulting in a less smooth surface. A SNRP of greater than 77 KW hrs/metric ton after disc refining described above generates a stock slurry that is difficult to drain from the fourdrinier wire. Specific Net Refiner Power is calculated by the following formula: (Applied Power in Kilowatts to the refiner—the No Load Kilowatts)/(.251*% consistency*flow rate in gpm*0.907 metric tons/ton).

For the formation of cellulose paper of sufficient smoothness, it is desirable to rewet the paper surface prior final calendering. Papers made on the paper machine with a high moisture content calendar much more readily that papers of the same moisture content containing water added in a remoistening operation. This is due to a partial irreversibility in the imbition of water by cellulose. However, calendering a paper with high moisture content results in blackening, a condition of transparency resulting from fibers being crushed in contact with each other. The crushed areas reflect less light and, therefore, appear dark, a condition that is undesirable in an imaging application such as a base for imaging materials. By adding moisture to the surface of the paper after, the paper has been machine dried and the problem of blackening can be avoided while preserving the advantages of high moisture calendering. The addition of surface moisture prior to machine calendering is intended to soften the surface fibers and not the fibers in the interior of the paper. Papers calendered with a high surface moisture content generally show greater strength, density, gloss, and processing chemistry resistance, all of which are desirable for a display support and have been shown to be perceptually preferred to prior art translucent display paper bases.

There are several paper surface humidification/moisturization techniques. The application of water, either by mechanical roller or aerosol mist by way of an electrostatic field, are two techniques known in the art. The above techniques require dwell time, hence web length, for the water to penetrate the surface and equalize in the top surface of the paper. Therefore, it is difficult for these above systems to make moisture corrections without distorting, spotting, and swelling of the paper. The preferred method to rewet the paper surface prior final calendering is by use of a steam application device. A steam application device uses saturated steam in a controlled atmosphere to cause water vapor to penetrate the surface of the paper and condense. Prior to calendering, the steam application device allows a considerable improvement in gloss and smoothness due to the heating up and moisturizing the paper of this invention before the pressure nip of the calendering rolls. An example of a commercially available system that allows for controlled steam moisturization of the surface of cellulose paper is the "Fluidex System" manufacture by Pagendarm Corp.

For translucent imaging supports, the use of a steam on the face side of the paper only is preferred since improved surface smoothness has commercial value for the imaging side of the paper. Application of the steam to both sides of the paper, while feasible, is unnecessary and adds additional cost to the product.

The preferred moisture content by weight after applying the steam and calendering is between 7% and 9%. A moisture level less than 7% is more costly to manufacture since more fiber is needed to reach a final basis weight. At a moisture level greater than 10%, the surface of the paper begins to degrade. After the steam foil rewetting of the paper surface, the paper is calendered before winding of the paper. The preferred temperature of the calender rolls is between 76° C. and 88° C. Lower temperatures result in a poor surface. Higher temperatures are unnecessary, as they do not improve the paper surface and require more energy.

When using a cellulose paper base, it is preferable to extrusion laminate the microvoided composite sheets to the base paper using a polyolefin resin. Extrusion laminating is carried out by bringing together the biaxially oriented sheets of the invention and the paper base with application of a melt extruded adhesive between the paper sheets and the biaxially oriented polyolefin sheets, followed by their being pressed in a nip such as between two rollers. The melt extruded adhesive may be applied to either the biaxially oriented sheets or the base paper prior to their being brought into the nip. In a preferred form the adhesive is applied into the nip simultaneously with the biaxially oriented sheets and the base paper. The adhesive used to adhere the biaxially oriented polyolefin sheet to the paper base may be any suitable material that does not have a harmful effect upon the imaging element. A preferred material is metallocene catalyzed ethylene plastomers that are melt extruded into the nip between the paper and the biaxially oriented sheet. Metallocene catalyzed ethylene plastomers are preferred because they are easily melt extruded, adhere well to biaxially oriented polyolefin sheets of this invention, and adhere well to gelatin sub polyester support of this invention.

The structure of a preferred display support where the imaging layers are applied to the biaxially oriented polyolefin sheet is as follows:

Biaxially oriented polyolefin sheet
Metallocene catalyzed ethylene plastomer (bonding layer)
80 g/m² basis weight cellulose paper base As used herein, the phrase "imaging element" is a material that utilizes nonphotographic or nonsilver halide technology in the formation of images. Nonphotographic imaging methods include thermal dye transfer, ink jet, electrophotographic, electrographic, flexographic printing or rotogravure printing.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount which is effective for the intended purpose. In general, good results have been obtained at a concentration of from about 1 to about 10 g/m². An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element, and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photorecptors.

In one form of the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods, such as solvent coating, or melt extrusion coating techniques. The DRL is coated over the tie layer or TL at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166; and Japanese patents 1,095,091; 2,276,671; 2,276,670; 4,267,180; 5,024,335; 5,016,517 discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717, discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717 disclose ink-absorbent resin layers comprising mixtures of vinyl pyrrolidone polymers and acrylic or methacrylic polymers. Sato et al. in U.S. Pat. No. 5,194,317 and Higuma et al. in U.S. Pat. No. 5,059,983 disclose aqueous-coatable DRL formulations based on poly (vinyl alcohol). Iqbal, in U.S. Pat. No. 5,208,092 discloses water-based ink receiver layer or IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 $\mu$m DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717, in European Patent Specification 0 524 626. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Printing generally accomplished by Flexographic or Rotogravure. Flexography is an offset letterpress technique where the printing plates are made from rubber or photopolymers. The printing is accomplished by the transfer of the ink from the raised surface of the printing plate to the support of this invention. The Rotogravure method of printing uses a print cylinder with thousands of tiny cells which are below the surface of the printing cylinder. The ink is transferred from the cells when the print cylinder is brought into contact with the web at the impression roll.

Suitable inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

When the support of this invention is printed with Flexographic or Rotogravure inks a ink adhesion coating may be required to allow for efficient printing of the support. The top layer of the biaxially oriented sheet may be coated with any materials known in the art to improve ink adhesion to biaxially oriented polyolefin sheets of this invention. Examples include acrylic coatings and polyvinyl alcohol coatings. Surface treatments to the biaxially oriented sheets of this invention may also be used to improve ink adhesion. Examples include corona and flame treatment.

The following examples illustrate the practice of this invention. They are not intended to be exhaustive of all possible variations of the invention. Parts and percentages are by weight unless otherwise indicated.

EXAMPLES

Example 1

In this example, a translucent display material was made using a ink jet receiving layer coated on a biaxially oriented polyolefin sheet laminated to a paper base. The paper had the required thickness and basis weight (70 g/m$^2$) to obtain an acceptable spectral transmission. This example will show that the lamination of the biaxially oriented sheet to a cellulose paper provided the required strength for digital printing and handling of the image layers and provided a superior, low cost transmission display material. The following cellulose paper based was laminated with a biaxially oriented sheet to create an imaging support:

The cellulose paper base of this example was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An 70 g/m bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

The following biaxially oriented polyolefin sheet was extrusion laminated to the top side of the cellulose paper:

Top Sheet (Image side):

A composite sheet consisting of 5 layers identified as L1, L2, L3, L4, and L5. L1 is the thin colored layer on the top of the biaxially oriented sheet to which the ink jet dye receiving layer was coated. L2 is the layer to which optical brightener and $TiO_2$ was added. The optical brightener used was Hostalux KS manufactured by Ciba-Geigy. Rutile $TiO_2$ was added to the L2 at 2% by weight of base polymer. The $TiO_2$ type was DuPont R104 (a 0.22 $\mu$m particle size $TiO_2$). Table 1 below lists the characteristics of the layers of the biaxially oriented sheet used in this example.

TABLE 1

| Layer | Material | Thickness, $\mu$m |
|---|---|---|
| L1 | LD Polyethylene + color concentrate | 0.75 |
| L2 | Polypropylene + $TiO_2$ + OB | 4.32 |
| L3 | Voided Polypropylene | 24.9 |
| L4 | Polypropylene | 4.32 |
| L5 | Polypropylene | 0.762 |
| L6 | LD Polyethylene | 11.4 |

The top sheet used in this example was coextruded and biaxially oriented. The top sheet was melt extrusion laminated to the paper base using a metallocene catalyzed ethylene plastomer (SLP 9088) manufactured by Exxon Chemical Corp. The metallocene catalyzed ethylene plastomer had a density of 0.900 g/cc and a melt index of 14.0.

The L3 layer for the biaxially oriented sheet is microvoided and further described in Table 2 where the refractive index and geometrical thickness is shown for measurements made along a single slice through the L3 layer; they do not imply continuous layers; a slice along another location would yield different but approximately the same thickness. The areas with a refractive index of 1.0 are voids that are filled with air and the remaining layers are polypropylene.

TABLE 2

| Sublayer of L3 | Refractive Index | Thickness, $\mu$m |
|---|---|---|
| 1 | 1.49 | 2.54 |
| 2 | 1 | 1.527 |
| 3 | 1.49 | 2.79 |
| 4 | 1 | 1.016 |
| 5 | 1.49 | 1.778 |
| 6 | 1 | 1.016 |
| 7 | 1.49 | 2.286 |
| 8 | 1 | 1.016 |
| 9 | 1.49 | 2.032 |
| 10 | 1 | 0.762 |
| 11 | 1.49 | 2.032 |
| 12 | 1 | 1.016 |
| 13 | 1.49 | 1.778 |
| 14 | 1 | 1.016 |
| 15 | 1.49 | 2.286 |

An ink jet image receiving layer was utilized to prepare the translucemt display material of this example and was coated on the L1 polyethylene layer on the top biaxially oriented sheet. The ink jet image receiving layer was coated by means of an extrusion hopper, a dispersion containing 326.2 g of gelatin, 147 g of BVSME hardener, i.e., bis (vinylsulfonylmethyl) ether 2% solution in water, 7.38 g of a dispersion containing 2.88 g of 11.5 $\mu$m polystyrene beads, 0.08 g of Dispex™ (40% solution in water obtained from Allied Colloids, Inc.), and 4.32 g of water, and 3.0 g of a 20% solution in water of Surfactant 10G (nonylphenoxypolyglycidol) obtained from Olin Matheson Company. The thckness was about 5 $\mu$m (dried thickness).

Onto this layer was coated by means of an extrusion hopper an aqueous solution containing 143.5 g of a 3% solution in water of 4.42 g of hydroxypropyl cellulose (Methocel KLV100, Dow Chemical Company), 0.075 g of vanadyl sulfate, 2-hydrate obtained from Eastman Kodak Company, 0.075 g of a 20% solution in water of Surfactant 10G (nonylphenoxypolyglycidol) obtained from Olin Matheson Company, and 145.4 g of water; and 0.45 g of a 20% solution in water of Surfactant 10G (nonylphenoxypolyglycidol) obtained from Olin Matheson Company and 79.5 g of water to form an ink-receiving layer about 2 microns in thickness (dry thickness).

The structure of the ink jet paper translucent display material of this example was as follows:

Ink jet receiving layer
Biaxially oriented, microvoided polyolefin sheet
Metallcoene ethylene plastomer
70 g/m² basis weight cellulose paper base The bending stiffness of the paper base and the laminated translucent display material support prior to adding the ink jet receiving layers was measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position. In this test the stiffness in both the machine direction and cross direction of the paper base was compared to the stiffness of the base laminated with the top biaxially oriented sheet of this example. The results are presented in Table 3.

TABLE 3

| | Machine Direction Stiffness (millinewtons) | Cross Direction Stiffness (millinewtons) |
|---|---|---|
| Before Lamination | 44 | 38 |
| After Lamination | 93 | 82 |

The data above in Table 3 show the significant increase in stiffness of the paper base after lamination with a biaxially oriented polymer sheet. This result is significant in that prior art photographic paper base translucent display materials did not provide an adequate amount of stiffness for product handling and display. The stiffness for the control measured to be 40 millinewtons in the machine direction, while stiffness for the invention from Table 3 is 93 millinewtons in the machine direction. At equivalent stiffness, the significant increase in stiffness after lamination allows for a thinner paper base to be used compared to prior art paper base transmission display materials, thus reducing the cost of the display support. Further, a reduction in display material thickness allows for a reduction in material handling costs, as rolls of thinner material weigh less and are smaller in roll diameter.

The display support was measured for status A density using an X-Rite Model 310 photographic densitometer. Spectral transmission is calculated from the Status A density readings and is the ratio of the transmitted power to the incident power and is expressed as a percentage as follows: $T_{RGB}=10^{-D}*100$ where D is the average of the red, green, and blue Status A transmission density response. The display materials were also measured for L*, a*, and b* using a Spectrogard spectrophotometer, CIE system, using illuminant D6500. In transmission, a qualitative assessment was made as to the amount of illuminating backlighting show through. A substantial amount of show through would be considered undesirable, as the nonfluorescent light sources used in this test could interfere with the image quality. The display material of this example was printed with various test images on a Hewlett Packard DeskJet 870 Cxi ink jet printer. The comparison data for invention and control are listed in Table 4 below.

TABLE 4

| Measure | Laminated Paper Base Invention |
|---|---|
| % Transmission | 27% |
| CIE D6500 L* | 57.6 |
| CIE D6500 a* | −0.06 |
| CIE D6500 b* | −0.82 |
| Illuminating Backlight Showthrough | None |

The biaxially oriented laminated cellulose paper base support coated with the ink jet image receiving of this example exhibits all the properties needed for an imaging paper transmission display material. Further the display material of this example has many advantages over prior art paper base display materials. The voided or nonvoided layers have levels of $TiO_2$ and colorants adjusted to provide optimum optical properties for control of b*, opacity, and filament show through. The density minimum areas for the invention are neutral white (b* of −0.82 for the invention), offsetting the native yellowness of the gelatin used in the ink jet image receiving layer producing a perceptually preferred paper base display material. Because $TiO_2$ added to the L2 layer is concentrated in the biaxially oriented sheet, the problems associated with adding $TiO_2$ in the imaging layer that are typical of prior art imaging materials are avoided. Additionally, this imaging support would be lower in cost over prior art polymer base materials, as a thinner laminated paper base is less expensive than a polymer base. The 70 g/m² paper base used in this example is much lower basis weight than the typical 110 g/m² prior art paper bases. In transmission, the illuminating backlights did not show through indicating the invention was able to diffuse the illuminating backlight and allow enough light to be transmitted to provide a quality image.

The 27% transmission for the invention provides an acceptable transmission image as 27% transmission allows enough light through the support to illuminate the image. Further, concentration of the tint materials and the white pigments in the biaxially oriented sheet allows for improved manufacturing efficiency and low a material utilization resulting in a low cost transmission display material. The a* and L* for the invention are consistent with a high quality transmission display material. Because the paper base of this example was laminated with a thin high strength sheet, the biaxially oriented sheet provided the necessary strength to allow for efficient transport through the Hewlett Packard DeskJet 870 Cxi ink jet printer. Finally, because ink jet printing technology was utilized to form the images, the images was printed in 12 minuets compared to a much longer typical time to image for photographic transmission display materials.

The invention has been described in detail with particular reference to preferred embodiments thereof, but it will be understood that variations and modifications can be effected within the spirit and scope of the invention.

What is claimed is:

1. An imaging element comprising a paper base, one layer of biaxially oriented polyolefin sheet and at least one image layer wherein said imaging element diffuses light, said paper base sheet has a basis weight of between 40 and 120 g/m², and said biaxially oriented polyolefin sheet has a spectral transmission of between 40% and 60%, and a reflection density less than 60%.

2. The imaging element of claim 1 wherein said reflection density is between 46 and about 54%.

3. The imaging element of claim 1 wherein said biaxially oriented polyolefin sheet further comprises microvoids.

4. The imaging element of claim 3 wherein said microvoids comprise at least one layer of said biaxially oriented polyolefin sheet and have at least 6 voids in the vertical direction at substantially every point of the biaxially oriented polyolefin sheet.

5. The imaging element of claim 4 wherein said biaxially oriented polyolefin sheet comprises between 6 and 30 voids in the vertical direction.

6. The imaging element of claim 1 wherein said biaxially oriented polyolefin sheet has an integral layer of polyethylene on the top of said sheet.

7. The imaging element of claim 1 wherein said paper base is substantially free of pigment.

8. The imaging element of claim 7 wherein said spectral transmission is between 46 and 54%.

9. The element of claim 8 wherein said element comprises only one layer of biaxially oriented polyolefin sheet and said only one sheet is on the top of said element.

10. The imaging element of claim 1 wherein said at least one image layer is located on the top side of said imaging element.

11. The imaging element of claim 1 wherein said biaxially oriented polyolefin sheet comprises between 4 and 12 weight percent of titanium dioxide.

12. The element of claim 1 wherein said element comprises at least one ink jet receiving layer.

13. The element of claim 1 wherein said element comprises at least one thermal dye transfer receiving layer.

14. The element of claim 1 wherein said element comprises at least one electrophotographic receiving layer.

15. The element of claim 1 wherein said element comprises at least one printing ink receiving layer.

16. The element of claim 1 wherein said element comprises only one layer of biaxially oriented polyolefin sheet and said only one sheet is on the top of said eielment.

17. A method of imaging comprising providing an imaging element comprising a paper base, at least one layer of biaxially oriented polyolefin sheet and at least one imaging layer, wherein said paper base has a basis weight of between 40 and 120 g/m², and said biaxially oriented polyolefin sheet has a spectral transmission of between 40% and 60%, and a reflection density less than 60%, said imaging element diffuses light, and ink jet printing on said image layer.

18. A method of imaging comprising providing an imaging element comprising a paper base, at least one layer of biaxially oriented polyolefin sheet and at least one imaging layer, wherein said imaging member diffuses light, said paper base has a basis weight of between 40 and 120 g/m², and said biaxially oriented polyolefin sheet has a spectral transmission of between 40% and 60% and a reflection density less than 60%, and thermal dye transfer printing on said image layer.

19. A method of imaging comprising providing an imaging element comprising a paper base, at least one layer of biaxially oriented polyolefin sheet and at least one imaging layer, wherein said imaging member diffuses light, said paper base has a basis weight of between 40 and 120 g/m$^2$, and said biaxially oriented polyolefin sheet has a spectral transmission of between 40% and 60% and a reflection density less than 60%, and electrophotographicly printing on said image layer.

20. A method of imaging comprising providing an imaging element comprising a paper base, at least one layer of biaxially oriented polyolefin sheet and at least one imaging layer, wherein said imaging member diffuses light, said paper base has a basis weight of between 40 and 120 g/m$^2$, and said biaxially oriented polyolefin sheet has a spectral transmission of between 40% and 60% and a reflection density less than 60%, and gravure printing on said image layer.

* * * * *